United States Patent [19]
Yamaguchi et al.

[11] 3,765,906
[45] Oct. 16, 1973

[54] WATER SOLUBLE MONASCUS PIGMENT

[76] Inventors: Yuzo Yamaguchi, No. 32, Hakuraku-cho, Kanagawa-ku, Yokohama-shi, Kanagawa-ken; Hideichi Ito, No. 15-5, Shiba 1-chome, Mimato-ku, Tokyo; Susumu Watanabe, No. 87-6, Minami-Honjuku-cho, Asahi-ku, Yokohama-shi, Kanagawa-ken; Toshio Yoshida, No. 942-2, Matsumi-cho, 3-chome, Kanagawa-ku, Yokohama-shi, Kanagawa-ken; Akira Komatsu, No. 34, Chihaya-sho, 4-chome, Toshima-ku, Tokyo, all of Japan

[22] Filed: Mar. 28, 1972

[21] Appl. No.: 238,949

[52] U.S. Cl. .................... 99/148, 195/81, 260/112
[51] Int. Cl. .................................................. A23l 1/26
[58] Field of Search ............... 99/148; 195/81, 35; 260/112

[56] References Cited
UNITED STATES PATENTS
2,068,623   1/1937   Warburg ............................ 260/112
2,111,692   3/1938   Saunders et al. .................. 260/112

OTHER PUBLICATIONS
Wolf & Wolf, The Fungi, John Wiley & Sons, N.Y. 1947 p. 84.
Miller, The Pfizer Handbook of Microbial Metabolites McGraw–Hill Book Co. N.Y. 1961 pp. 415–416.
Fielding et al., Chemistry of Fungi, Chem. Absts. Vol. 56, 1962.
Kumasaki et al., "Structure of Monascorubin" Chem. Absts. Vol. 58 6809(g) 1963.

Primary Examiner—Alvin E. Tanenholtz
Assistant Examiner—J. M. Hunter
Attorney—Joseph M. Lane et al.

[57] ABSTRACT

A non-soluble monascus pigment, containing principally monascorubin is first obtained by fermenting a culture of Monascus purpureus or Monascus anka, and is then reacted with one or more members selected from water soluble proteins, water soluble peptides and amino acids to yield the soluble pigment. Alternately, the soluble pigment is produced by fermenting the above mentioned microorganisms in a culture medium containing one or more members selected from water soluble proteins, water soluble peptides and amino acids.

8 Claims, No Drawings

WATER SOLUBLE MONASCUS PIGMENT

BACKGROUND OF THE INVENTION

1. Field of the Invention

The present invention relates to a water soluble monascus pigment and to a process for producing a water soluble monascus pigment by fermenting microorganisms belonging to the genus Monascus.

2. Description of the Prior Art

For some time it has been known that a microorganism belonging to genus Monascus, particularly *Monascus-purpureus* or *Monascus-anka*, produces a red pigment in a culture medium. An early report (Nishikawa et al: J. Agr. Chem. Soc. Japan, Vol. 8, Page 1007 (1932)), reveavled that these pigments contain principally monascorubrin together with a small amount of rubropunctation and monascoflavin. That same report reveals that the pigment tends to accumulate in the microorganisms because of its poor water solubility.

SUMMARY OF THE INVENTION

It has now been discovered that a monascus pigment can be water-solubilized by reacting it with a water soluble protein, a water soluble peptide, an amino acid or combination thereof. The soluble pigment produced in this manner exhibits a deep scarlet color.

It has also been discovered that the water soluble pigment of this invention can be obtained by the fermentation of microorganisms belonging to the genus Monascus in a culture medium containing a water soluble protein, a water soluble peptide, an amino acid or a combination thereof.

The water soluble monascus pigment of the present invention is suitable for a coloring or dye for foodstuffs, particularly the sour type drinks, candy, milk products, meat products, etc.

Accordingly, it is an object of the present invention to provide a water soluble monascus pigment and a process for producing the same.

DESCRIPTION OF THE PREFERRED EMBODIMENTS

The monascus pigment treated according to the present invention can be produced by:

1. fermenting Monascus purpureus or a Monascus anka in a conventional culture medium containing inorganic nutrients and carbon sources such as glucose, dextrine, under aeorbic conditions, generally at a temperature of about 27°C for about 70 to 120 hours;

2. collecting the mycelia from the fermented broth after the fermentation; and 3. extracting the pigment therefrom by using an organic solvent such as alcohol.

The monascus pigment produced in the above manner contains monascorubrin as the principle constituent together with small amounts of rubropunctation and monascoflavin. The pigment is then converted to a water soluble form by reacting it with a water soluble protein, a water soluble peptide, an amino acid or mixtures thereof.

It has been experimentally determined that, when the monascus pigment reacts with a water soluble protein, a chemical reaction occurs which changes the absorption spectrum for this compound within the visible light region. Specifically, the absorption at 250 m$\mu$ is increased and the color tone of the pigment so obtained appears to change from a brownish red to a deep scarlet. It has also been determined that the characteristics of the pigment product, produced by the above-described reaction, substantially agree with those of the water soluble protein reactant used.

Water soluble proteins and water soluble peptides which may be used in the present invention include milk protein, soybean protein, peanut protein, wheat protein, egg protein, water soluble proteins from animal fleshes such as those of poultry such as fowl and turkeys; livestock such as cattle, horses, and sheep; fish such as tuna and whales; and, the water soluble partial hydrolyzates of the insoluble proteins of above-mentioned materials. The preferred amino acids include lysine, arginine, histidine, glustamine, and asparagine. However, the present invention is not limited to the use of such compounds.

In the process of the present invention, the monascus pigment, obtained as described above, is mixed with a water soluble protein, a water soluble peptide, an amino acid or with mixtures thereof. The pH of the mixture thus obtained is then adjusted to a neutral or weak alkaline state, preferably a pH of from about 5 to 8.5, and is then reacted.

To perform the process of the present invention on an industrial scale, the mycelium which has been obtained by fermentation may be extracted by an organic solvent and the extracted solution then mixed with a solution of a water soluble protein, a water soluble peptide, an amino acid or a mixture thereof. This industrial procedure does not involve separation of the pigment.

The reaction usually requires several minutes or in several hours. As the reaction progresses, the color tone of the pigment changes from a brownish red to a deep scarlet and the pigment becomes water soluble.

After the completion of the reaction, the resultant solution is freeze-dried and then ground or is condensed under vacuum and spray-dried.

The solubility of the pigment in water varies according to the type of protein, peptide or amino acid used. The pigments obtained from lysine, asparagine, and amino acids have a particularly high solubility in water and also organic solvents. Because such pigments have amphoteric characteristics, solubility becomes minimal at their isoelectric points at which points precipitation may occur.

In another embodiment of the present invention a process is provided wherein the water insoluble monascus pigment, produced by fermenting the aforesaid microorganisms, is produced directly in a water soluble form by fermenting the microorganism in a culture medium containing a water soluble protein, a water soluble peptide, an amino acid or a mixture thereof. In this embodiment, the water soluble protein, water soluble peptide or amino acid is added to a conventional culture medium, and then a *Monascus purpureus* or a *Monascus anka* is inoculated therein, followed by fermentation in a neutral or alkaline state, preferably at a pH of from 7 to 9, under aerobic conditions and at a temperature of about 27°C for 48 to 72 hours. The result is a deep scarlet pigment which develops in the culture medium. Filtration of the fermentation broth produces a dark purple or dark red filtrate.

The mechanism wherein a water insoluble monascus pigment becomes water soluble as a result of the reaction with a protein, peptide or amino acid is not clear. Moreover, the structure of reaction product is not known. However, experiments show that the pigment obtained by fermentation in a culture medium containing a water soluble soybean protein, exhibits an isoelectric point at a pH of 4.01 and behaves as a micromolecule, as indicated by the gel filtration analysis. Therefore, the pigment obtained by the process of the present invention is assumed to be a water soluble complex wherein the monascus reactant is bonded to the chosen amino group containing reactant through the amino groups.

The amounts of the water soluble protein, water soluble peptide, or amino acid used in the process of this invention may vary within a wide range, but preferably fall within the range of from 1 to 3 parts per one part of carbon source in the culture medium.

The reaction between the insoluble monascus pigment and the water soluble protein, water soluble peptide, or amino acid is approximately a mole per mole reaction. Where the water soluble monascus pigment is produced by reacting a monascus pigment with a water soluble protein, a water soluble peptide or an amino acid, the amount of this latter reactant should be in the range of from 20 to 50 parts by weight per one part of crude monascus pigment.

The pigment obtained according to the present invention is particularly useful as a food dye. Alternatively, if the protein reactant selected is of the type that does not precipitate in an acidic state, for example, protamine, or globin constituting a protein of a hemoglobin, then a pigment is obtained which is particularly suited for use as a colorant for sour type drinks.

The following examples of the process of this invention are given for the purpose of more fully illustrating the invention and are not intended to limit the scope of the invention. All percentages given are percentages by weight.

Example 1

Part 1: 3 liters of a culture medium containing 2.0 percent of glucose, 2.0 percent of rice powder, 0.3 percent of dipotassium hydrogen phosphate, and 0.1 percent of magnesium sulfate, and having a pH of 6.5, was placed in a jar fermentor and sterilized. After cooling, *Monascus purpureus* AHU 9096 was inoculated in the medium for the fermentation at an aeration rate 1.5 min. and an agitation rate of 300 R.P.M. under a back pressure of 0.2 kg/cm$^2$ and at a temperature of 27°C for 120 hours. The mycelium was then collected by means of centrifugal seapration, followed by drying in a vacuum and then by extraction of the pigment with alcohol to obtain a crude pigment. A 1 percent by weight solution of this crude pigment in alcohol exhibited a yellow or brownish red color with maximum absorption at 410 and 510 m$\mu$ when optical densities for these wave lengths were 0.271 and 0.160, respectively.

Part 2: 0.5g of the crude pigment obtained in Part 1 above was dissolved in 100 ml of ethanol which was thereafter mixed with 500 ml of a 0.5 percent solution of an undenatured soybean protein. The mixture was then allowed to stand for one hour at room temperature. The color tone of the solution changed from brownish red to deep scarlet, suggesting the formation of a complex. The complex was then freeze-dried and ground to produce 22g of a "monascus pigment-soybean protien complex" in the form of powder. This powder product was readily soluble in water having a pH within the range of from a neutral to a weak alkaline state, and exhibited an isoelectric point at a pH of 4 to 3 at which point precipitation occurred.

Example 2

0.5g of the crude pigment obtained in Part 1 of Example 1 was dissolved in 100 ml of ethanol. The solution thus obtained was added to 500 ml of a 3 percent solution of casein dissolved in 0.1 M phosphate buffer (pH 8.5). The resulting mixture was allowed to stand for 3 hours at a room temperature. After the reaction reached completion, the solution was freeze-dried. The dry complex was then subjected to grinding to provide 12g of a monascus pigment-casein complex in powder form. This powder is water soluble at a pH of over 8, has an isoelectric point at a pH of 4.5 to 5.0, and exhibits a deep scarlet color.

Example 3

Part 1: 25 liters of a culture medium, containing 2.5 percent of dextrine (DE 8.5) by weight, 0.3 percent of ammonium sulfate, 0.1 percent of urea, 0.5 percent of dipotassium hydrogen phosphate, 0.2 percent magnesium sulfate and 0.1 percent of yeast extract, was placed in a jar fermentor and sterilized. After cooling, 5 percent of a 48 hour fermented solution of the Monascus anka (IFO 6540) was inoculated in the medium thus prepared. The fermentation was carried out at an aeration rate of 12 liters/min and at an agitation rate of 250 R.P.M. under a back pressure of 0.5 kg/cm$^2$ and at a temperature of 27°C for 96 hours. The mycelium was filter-separated, followed by vacuum drying. The pigment was extracted from the dried residue with ethanol to give 43g of a crude pigment. The crude pigment so obtained proved to contain about 70 percent of monascorubin and about 20 percent of rubropunctation.

Part 2: 1.0g of the crude pigment obtained in Part 1 was dissolved in 500 ml of ethanol. The solution thus prepared was then mixed with 1,500 ml of a 3 percent defatted soybean protein solution and allowed to stand at room temperature for 1 hour. The solution was then condensed in a vacuum to 350 ml, and spray-dried to yield 40g of a monascus pigment-soybean protein complex.

Example 4

1.0 gm. of the crude pigment obtained in Part 1 of Example 3 was dissolved in 500 ml of ethanol and then mixed with 1,000 ml of a polypeptide solution (USA Stephan Chemical Co.) (solid 3 percent), after which it was allowed to stand at room temperature for some time. Subsequently, the solution thus prepared was condensed under vacuum to 300 ml followed by spray-drying to give 22g of a monascus pigment-polypeptide 37 S complex. This complex is a water soluble, deep scarlet powder.

Example 5

1.0g of the crude pigment as obtained in Part 1 of Example 3 was dissolved in 500 ml of ethanol. The solution was then mixed with one liter of a 2 percent lysine solution and allowed to stand at room temperature. The solution was concentrated under vacuum and freeze-dried to produce 17.8g of a deep scarlet monascus pigment-lysine complex. This complex was found to be soluble in hot water and in ethanol.

Example 6

20 liters of a culture medium, containing 2.0 percent glucose, 2.0 percent defatted soybean meal, and 0.005 percent of a silicone antifoaming agent and having a pH of 6.4, was placed in a 30 liter fermentor and sterilized at a temperature of 121°C for 30 minutes. After cooling, 5 percent of a 48 hour culture broth of the *Monascus purpureus* AHU 9096 was inoculated in the medium for fermentation. The reaction was conducted with an aeration rate of 10 liter/min, an agitation rate of 250 R.P.M., a back pressure of 0.2 kg/cm$^2$ and a temperature of 27°C for 72 hours.

After the completion of the fermentation, the mycelium was filter-separated using a fabric bag to obtain 185 liters of a fermented solution of a deep scarlet color. The optical density of a 100:1 solvent to solute portion of this fermented solution was 0.458 at 420 m$\mu$ and 0.439 at 530 m$\mu$, respectively. The fermented solution was concentrated under reduced pressure to about one tenth of its original volume and spray-dried to give 270g of a monascus pigment in powder form. The powder was found to be water soluble and precipitated at a pH of 3 to 4 when acidified with citric acid.

Example 7

20 liters of a culture medium, containing 2.0 percent glucose, 2.5 percent peptone, 0.5 percent dipotassium hydrogen phosphate, 0.5 percent magnesium sulfate and 0.1 percent yeast extract, was treated as in Example 1 to produce 18.9 liters of a fermented solution having a deep scarlet color. The optical density of a 1 percent solution of the above ferment was determined to be 0.387 at 420 m$\mu$ and 0.374 at 520 m$\mu$. The fermented solution was then condensed under a reduced pressure to about one tenth of the original volume and then spray-dried to give 348 gm. of a monascus pigment. The pigment obtained was soluble in hot water and 1did not precipitate even when the solution was made acidic.

Example 8

A culture medium, containing 2.0 percent glucose, 2.0 percent rice powder, 0.3 percent dipotassium hydrogen phosphate, 0.1 percent magnesium sulfate and 3 percent casein and having a pH of 8.5, was treated in the same manner as in Example 1 to produce a monascus pigment. This pigment was water soluble at a pH of over 8 and of a deep scarlet color. A solution of this pigment was found to be isoelectric within the pH range of 4.5 to 5.0.

Example 9

The procedure of Example 1 was repeated except that a *Monascus anka* IFO 6540 was used in place of the *Monascus purpureus* AHU 9096. 295g of a monascus pigment was obtained.

Example 10

A culture medium, containing 2.5 percent dextrine (DE 8.5), 3 percent polypeptide 37 S (USA Stephan Chemical Co.), 3 percent ammonium sulfate, 0.1 percent urea, 0.5 percent dipotassium hydrogen phosphate, 0.2 percent magnesium sulfate and 0.1 percent yeast extract, was placed in a jar fermentor and sterilized. After cooling, 5 percent of a 48 hour fermented solution of *Monascus anka* IFO 6540 was inoculated into the medium, followed by fermentation at an aeration rate of 12 liters/min, an agitation rate of 250 R.P.M. and a back pressure of 0.5 kg/cm$^2$ at a temperature of 27°C for 96 hours. The mycelium was filter-separated and treated in the same manner as in Example 1 to produce a monascus pigment. The pigment was a deep scarlet powder which was found to be water soluble.

Example 11

Lysine was substituted for the polypeptide 37 S used in Example 5 and a deep scarlet monascus pigment was obtained. The pigment was soluble in hot water and in ethanol.

Thus, by following any of the procedures set forth above, the objects of the invention are accomplished.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for producing a water-soluble monascus pigment comprising:
   fermenting a microorganism selected from *Monascus purpureus* and *Monascus anka* in a culture medium, under aerobic conditions, to produce a monascus pigment;
   reacting said monascus pigment with a reactant member selected from the group consisting of water soluble proteins, water soluble peptides, amino acids, and mixtures thereof, to form the water-soluble monascus pigment.

2. The process of claim 1 wherein said reactant member is a protein selected from the group consisting of milk proteins, soybean proteins, peanut proteins, wheat proteins, egg proteins, and water soluble proteins from animal fleshes and fish.

3. The process of claim 1 wherein said reactant member is a peptide selected from the group consisting of hydrolyzates of proteins from animal fleshes and fish.

4. The process of claim 1 wherein said reactant member is an amino acid selected from the group consisting of lysine, arginine, histidine, glustamine, and asparagine.

5. A water solution monascus pigment formed by the process of claim 1.

6. A process for producing a water soluble monascus pigment comprising:
   fermenting a microorganism selected from *Monascus purpureus* and *Monascus anka* in a culture medium under aerobic conditions to produce a monascus pigment;
   separating said microorganisms from said culture medium;
   extracting a water-insoluble monascus pigment from said separated microorganisms using an organic solvent; and
   reacting said water-insoluble monascus pigment with a reactant member selected from the group consisting of water soluble proteins, water soluble peptides, amino acids, and mixtures thereof, to produce the water-soluble monascus pigment.

7. The process of claim 6 additionally comprising:
freeze-drying the organic solvent containing said water-soluble monascus pigment to produce a residue; and
grinding the residue to form a powder product.

8. The process of claim 6 additionally comprising: condensing said organic solvent containing said water-soluble monascus pigment under a reduced pressure; and
spray-drying the condensed solution to form a powder product.

* * * * *